Patented Apr. 26, 1949

2,468,111

UNITED STATES PATENT OFFICE 2,468,111

AZODISULFONIC ACID SALTS AS POLYMERIZATION CATALYSTS

James A. Robertson, Elsmere, Del., assignor to E. I. du Pont de Nemours & Company, Wilmington, Del., a corporation of Delaware No Drawing. Application April 26, 1946, Serial No. 665,328

5 Claims. (Cl. 260—80)

This invention relates to polymerization processes and more particularly to improvements in addition polymerization.

The polymerization of many important types of ethylenically unsaturated monomers proceeds slowly in conventional polymerization systems. Attempts to increase the rate of polymer formation by use of higher temperatures very often lead to low yields and products of inferior quality.

This invention has as an object a new addition polymerization process which makes possible the rapid polymerization of ethylenically unsaturated compounds in high conversion at low temperatures.

This and other objects are accomplished by the addition polymerization of ethylenically unsaturated compounds in the presence of a salt of azodisulfonic acid.

In the preferred method of carrying out this process, a mixture comprising the monomer and water is cooled to 0° C. and the azodisulfonate catalyst added. The polymerization is conducted under nitrogen at 0° to 30° C. and, upon completion of the reaction, the precipitated polymer is removed by filtration and washed with water.

The invention is illustrated by the following examples in which the parts given are by weight:

Example I

A pressure vessel is charged with 20 parts of acrylonitrile monomer and 265 parts of water, and the solution is cooled in ice to 10° C. Then 0.4 part of potassium azodisulfonate is added, the air in the reactor is replaced with nitrogen, and the reactor is closed. The reaction mixture is allowed to warm to 20° C. over a period of one hour, during which polymerization takes place. The polymer (13.5 parts) is separated by filtration, washed, and dried. The product has a molecular weight of 79,000 as determined by a solution viscosity method.

Example II

A pressure vessel is charged to 20% of its capacity with 74 parts of water and 6 parts of a 20% aqueous solution of sodium sulfonates prepared from paraffin white oils containing straight chain hydrocarbons having from 13 to 20 carbon atoms essentially as described in U. S. 2,197,800. The reactor is cooled in a dry ice-acetone bath, and 45 parts of vinyl chloride monomer and 0.4 part of potassium azodisulfonate are added. The vessel is purged of oxygen by permitting 5 parts of vinyl chloride to distill out. The vessel is then closed and allowed to warm under atmospheric conditions. Polymerization starts before the ice melts. After one hour, the vessel is opened, and the polymer is coagulated with brine, separated by filtration, washed with water, and dried. The yield of vinyl chloride polymer is 11 parts.

When ammonium persulfate is substituted for potassium azodisulfonate in the above example, only a trace of polymer is obtained.

Example III

A vessel provided with a mechanical stirrer and open to the atmosphere through an absorption tower packed with a desiccating agent, is charged with 70 parts of liquid ammonia, 23 parts of liquid vinyl chloride and 0.5 part of potassium azodisulfonate. The reaction mixture is kept at —50 to —30° C. for 23 hours and then is warmed to room temperature to remove ammonia and unreacted vinyl chloride. The yield of polyvinyl chloride is 9 parts. The intrinsic viscosity of the polymer (0.1 g. in 100 ml. of cyclohexanone at 25° C.) is 0.66.

Salts of azodisulfonic acid derived from organic and inorganic bases can be used in the present process. Salts of this kind comprise the azodisulfonates of lithium, sodium, potassium, beryllium, magnesium, calcium, strontium and barium. Of these compounds the alkali metal salts are the most satisfactory. The preferred salts of the organic bases are those of the tertiary amines, for example, tris(B-hydroxyethyl) ammonium azodisulfonate. Other useful salts of organic bases are methylammonium azodisulfonate, pyridinium azodisulfonate, and bis-(B-hydroxyethyl) ammonium azodisulfonate. Potassium azodisulfonate is particularly valuable in the practice of this invention, since it is outstanding in inducing rapid polymerization. Potassium azodisulfonate, $KO_3SN=NSO_3K$, is conveniently prepared by the procedure given by Konrad and Pellens, Ber. 59 B, 135 (1926).

The catalyst concentration can be varied widely depending upon the monomers employed, the end use of the polymer, and the rate of polymerization desired. However, the catalyst is generally present to the extent of 0.01 to 5%, based on the weight of the monomer. Since the best balance between rate of polymerization and polymer properties is obtained when from 0.1 to 2% of the catalyst is used, this range is preferred.

The polymerization temperature should be below 100° C., since azodisulfonates undergo decomposition violently at higher temperatures. With most monomers, a temperature in the range of —80 to 60° C. gives good results. It is preferable to employ a temperature between 0 and 30° C. in order to obtain the best quality polymers in high yield in a short time.

Any ethylenically unsaturated monomer which is capable of addition polymerization by the methods and with the catalysts heretofore used can also be used in the process of this invention. These ethylenically unsaturated monomers include compounds containing aliphatic or alicyclic carbon-to-carbon unsaturation. Examples of polymerizable monomers of this kind, in addition to those used in the examples, are compounds which contain the vinylidene radical

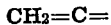

and which comprise compounds such as vinyl fluoride, vinyl acetate, styrene, ethylene, methyl methacrylate, butadiene, vinyl acetylene, and allylidene diacetate; vinylidene compounds such as vinylidene chloride and vinylidene fluoride. Further types of compounds capable of addition polymerization and therefore useful in the practice of this invention are the fluoroethylenes such as $F_2C=CXY$, where X can be hydrogen, chlorine or fluorine and Y can be chlorine or fluorine. Vinyl compounds are preferred since they are readily converted to desirable polymers in a short time.

The present process is also advantageously applied to the copolymerization of two or more monomers. For example, vinyl chloride can be readily interpolymerized with vinyl acetate. Compounds such as ethyl maleate and maleic anhydride, which show little tendency toward homopolymerization, can also be interpolymerized with vinyl chloride in the presence of a salt of azodisulfonic acid.

In practicing this invention, there can be used any of the conventional polymerization procedures, including bulk, solution, emulsion, and granulation techniques. Solution and emulsion polymerization procedures are preferred. Best results at temperatures above —10° C. are obtained in water, while at temperatures below —10° C. liquid ammonia is the preferred reaction medium. A variety of solvents can be employed, but water and water-miscible compounds such as ammonia, methanol, and tertiary butyl alcohol are preferred since their use results in a short polymerization cycle at a low temperature. Cationic, anionic, and non-ionic surface-active agents can be used in the emulsion polymerization systems. The choice of polymerization procedure will, of course, vary with the particular monomer used and also with the end use of the resulting product.

Polymers prepared in the presence of salts of azodisulfonic acid are of good quality and are suitable for use as fibers, foils, molded articles, and as ingredients of coating compositions and adhesives.

As many apparently widely different embodiments of this invention may be made without departing from the spirit and scope thereof, it is to be understood that I do not limit myself to the specific embodiments thereof except as defined in the appended claims.

I claim:

1. In a process for polymerizing ethylenically unsaturated organic compounds which undergo addition polymerization, the improvement which comprises conducting the polymerization in the presence of a catalytic amount of a salt of azodisulfonic acid at a temperature below 100° C.

2. The process set forth in claim 1 in which said salt is an alkali metal salt of azodisulfonic acid.

3. The process set forth in claim 1 in which said salt is potassium azodisulfonate.

4. In an improved process for polymerizing monomeric organic compounds, the step which comprises contacting a vinylidene compound which undergoes addition polymerization with a catalytic amount of a salt of azodisulfonic acid at a temperature below 100° C.

5. The process set forth in claim 4 in which said compound is a vinyl compound.

JAMES A. ROBERTSON.

REFERENCES CITED

The following references are of record in the file of this patent:

UNITED STATES PATENTS

| Number | Name | Date |
|---|---|---|
| 2,376,014 | Semon | May 15, 1945 |
| 2,376,390 | Semon | May 22, 1945 |
| 2,376,963 | Garvey | May 29, 1945 |